United States Patent Office 3,256,274
Patented June 14, 1966

3,256,274
PROCESS FOR THE INTRODUCTION OF A DOUBLE BOND INTO THE α,β-POSITION OF THE CARBONYL OF A STEROID LACTONE
Alexander D. Cross, Mexico City, Mexico, assignor to Syntex Corporation, Panama, Panama, a corporation of Panama
No Drawing. Filed Mar. 19, 1964, Ser. No. 353,257
15 Claims. (Cl. 260—239.57)

The present invention relates to a novel process for the production of cyclopentanophenanthrene derivatives.

More particularly the present invention relates to a novel process for the introduction of a double bond into the α,β-position of the carbonyl of a steroid lactone.

In accordance with the present invention the surprising discovery has been made that when steroid derivatives having a lactone grouping wherein each of the α and β carbon atoms are attached at least to one hydrogen atom and neither of which is involved in a double bond (said lactone grouping will hereinafter be called α,β-saturated) are treated with a quinone having an oxidation potential of less than −0.5 v. for a prolonged period of time there are obtained the corresponding α,β-unsaturated lactones.

The steroidal lactones which undergo with good yields said dehydrogenation are preferably the five membered, six membered or seven membered lactones. The steroidal lactones having less members than five or more than seven in the lactone ring, even though they also are dehydrogenated by the procedure of the present invention, do not render yields as good as the 5 to 7 membered lactones.

The steroidal saturated lactones which are good starting materials for the present process may be of the androstane, pregnane, spirostane, cholestane, caprostane, cholane, stigmastane, cardanolide or bufanolide series or the like.

The α,β-saturated lactone grouping may form part of the rings A, B, C and/or D of the steroid nucleus of the starting compound or may exist as a separate grouping attached to the unmodified steroid nucleus thereof.

There may be present in the molecule a number of substituents which do not interfere with the dehydrogenation of lactones, for example alkyl groups, halogens, hydroxyl groups which may be free, etherified or esterified, and the like. These substituents may be attached to any carbon atom of the molecule of the starting compound except the carbon atoms directly linked to the oxygen atoms of the lactone grouping. The starting compound may also have double bonds in any position of its molecule, except the α and β positions of the lactone ring.

Examples of suitable starting compounds for the present process are 4-oxa-5α-androstan-17β-ol-3-one,
4-oxa-5α-pregnane-3,20-dione,
4-oxa-coprostan-3-one,
17α-methyl-4-oxa-5α-androstan-17β-ol-3-one,
6-oxa-cholestan-7-one,
2:3-seco-coprostan-2-ol-3-oic(3→2)lactone,
3:4-seco-coprostan-4-ol-3-oic(3→4)lactone,
6-oxa-androstan-17β-ol-7-one,
6-oxa-androstan-17β-ol-7-one benzotate,
17α-(2′-carboxyethyl)-Δ¹,⁴-androstadien-17β - ol - 3 - one spirolactone,
17α-(2′-carboxyethyl)-19-nor-Δ⁵-androstene-3β,17β - diol spirolactone,
17α-methyl-2-oxa-5α-androstan-17β-ol-3-one,
2-oxa-5α-androstan-17β-ol-3-one,
12α-(2′-carboxyethyl)-Δ⁵,¹⁶-pregnadiene-3β,12β-diol - 20-one spirolactone,
12α-(2′-carboxyethyl)-Δ⁵-22-isospirostene - 3β,12β - diol spirolactone 3-acetate,
11:12-seco-22-iso-allospirostane-3β,12-diol - 11 - oic - (11-12)-lactone 3-acetate,
11:12-seco-Δ¹⁶-5α-pregnene-3β,12-diol-20-one - 11 - oic-11-12) lactone 3-acetate,
11:2-seco-5α-pregnane-3β,12,17α-triol-20-one - 11 - oic-(11-12)lactone,
11:12-seco-Δ¹,⁴-pregnadiene-12,17α,21-triol - 3,20 - dione-11-oic(11-12)lactone 21-acetate,
4-oxa-Δ⁵-pregnene-3,20-dione,
7:8-seco-cholestane-3β,8-diol-7-oic(7→8)lactone,
3:4-seco-cholestan-4-ol-3-oic(3→4)lactone,
Isoandrololactone,
Dihydrostrophanthidin,
Dihydrostrophanthidinic acid,
Dihydrogitoxigenin,
Bufotalan,
Tetrahydrobufotalin, and
4-oxa-cholestan-3-one.

In practicing the process of the present invention, a given amount of a starting α,β-saturated lactone of the above described type, is treated with at least approximately 1 molar equivalent of a benzoquinone with an oxidation potential of less than −0.5 v., preferably less than −0.75 v. and in particular 2,3-dichloro-5,6-dicyano-1,4-benzoquinone, using preferably an excess thereof, such as approximately from 1.1 to 10 molar equivalents, in an inert solvent, for a period of time from about 2 days preferably to about 10 days at a temperature ranging between room temperature and reflux temperature of the mixture to give the corresponding α,β-unsaturated lactone.

Examples of other quinones that may be used in carrying out the process of the present invention are: tetrachloro - orthobenzoquinone, 2,3 - difluoro-parabenzoquinone, 2,3-dibenzoyl-parabenzoquinone, 2,3-dicyano-parabenzoquinone, and the like.

When the starting material has present in its molecule α,β-saturated keto groups, the amount of quinone to be used should be higher than the ones specified above, in a number of molar equivalents equal to the number of keto groups present, for the quinone will first dehydrogenate the α,β-position of said groups, and thereafter the α,β-position of the lactone grouping.

The product formed by the dehydrogenation reaction may be isolated by any of a number of conventional procedures known to the skilled in the art.

Examples of solvents that may be used in the present dehydrogenating process are lower hydrocarbon aliphatic and alicyclic ethers, such as tetrahydrofuran, ether, or dioxane, homocyclic aromatic solvents, such as: benzene, toluene or xylene; lower alkanols such as: t-butanol or n-amyl alcohol; chlorinated lower hydrocarbons, such as chloroform, methylene dichloride or ethylene dichloride, and the like.

The process of the present invention makes it possible for the first time to transform saturated steroidal lactones into useful α,β-unsaturated lactones in one simple step.

Among the products which can be prepared using the process of the present invention are useful androgenic-anabolic agents such as 17α-methyl-2-oxa-Δ⁴-androsten-17β-ol-3-one, and 17α-methyl-4-oxa-Δ¹-androsten-17β-ol-3-one, important progestational compounds such as 4-oxa-Δ¹,¹⁶-5α-pregnadiene-3,20-dione; cardiotonic compounds such as digitoxigenin, and strophanthidin, etc.

The following specific examples serve to illustrate but are not intended to limit the scope of the present invention:

Example I

A mixture of 500 mg. of 4-oxa-cholestan-3-one, 20 cc. of dioxane and 3 molar equivalents of 2,3-dichloro-5,6-dicyano-1,4-benzoquinone was refluxed for 2 days. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 4-oxa-$\Delta^1$-cholesten-3-one.

Example II

A mixture of 500 mg. of 4-oxa-5α-androstan-17β-ol-3-one, 10 cc. of toluene and 1.5 molar equivalents of 2,3-dichloro-5,6-dicyano-1,4-benzoquinone was refluxed for 3 days. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 4-oxa-$\Delta^1$-5α-androsten-17β-ol-3-one.

Example III

A mixture of 500 mg. of 4-oxa-5α-pregnane-3,20-dione, 80 cc. of chloroform and 10 molar equivalents of 2,3-dichloro-5,6-dicyano-1,4-benzoquinone was refluxed for 3 days. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 4-oxa-$\Delta^{1,16}$-5α-pregnadiene-3,20-dione.

Example IV

A mixture of 500 mg. of 4-oxa-5α-androstan-17β-ol-3-one, 10 cc. of benzene and 2 molar equivalents of 2,3-dichloro-5,6-dicyano-1,4-benzoquinone was refluxed for 2½ days. It was then cooled, the 2,3-dichloro-5,6-dicyano-1,4-benzohydroquinone formed during the reaction filtered off, and the filtrate evaporated to dryness. Crystallization from methanol-benzene afforded 4-oxa-$\Delta^1$-5α-androsten-17β-ol-3-one.

Example V

The process of Example III was repeated, except that the solvent used was t-butanol and the reaction time was 5 days, thus giving 4-oxa-$\Delta^{1,16}$-5α-pregnadiene-3,20-dione.

Example VI

The procedure of Example I was repeated, except that the quinone used was tetrachloro-ortho-benzoquinone, thus yielding the same final compound.

Example VII

The procedure of Example II was repeated, except that 2,3-dicyano-parabenzoquinone was used instead of 2,3-dichloro-5,6-dicyano-1,4-benzoquinone and the reaction time was of 10 days, thus yielding 4-oxa-$\Delta^1$-5α-androsten-17β-ol-3-one.

Example VIII 4-oxa-5α-pregnane-3,20-dione was treated in accordance with Example III, except that the quinone used was 2,3-difluoro-parabenzoquinone, thus giving 4-oxa-$\Delta^{1,16}$-5α-pregnadiene-3,20-dione.

Example IX

The starting compounds listed under I were treated by the procedure described in Example I, thus yielding the corresponding products set forth under II.

| I | II |
|---|---|
| 4-oxa-5α-androstan-17β-ol-3-one | 4-oxa-$\Delta^1$-5α-androstan-17β-ol-3-one. |
| 4-oxa-5α-pregnane-3,20-dione | 4-oxa-$\Delta^{1,16}$-5α-pregnadiene-3,20-dione. |
| 4-oxa-coprostan-3-one | 4-oxa-$\Delta^1$-coprosten-3-one. |
| 17α-methyl-4-oxa-5α-androstan-17β-ol-3-one | 17α-methyl-4-oxa-$\Delta^1$-5α-androsten-17β-ol-3-one. |
| 26-oxa-cholestan-7-one | 6-oxa-$\Delta^8$-cholesten-7-one. |
| 2:3-seco-coprostan-2-ol-3-oic-(3→2)lactone | 2:3-seco-$\Delta^4$-cholesten-2-ol-3-oic-(3→2)lactone. |
| 3:4-seco-coprostan-4-ol-3-oic-(3→4)lactone | 3:4-seco-$\Delta^1$-coprosten-4-ol-3-oic-(3→4)lactone. |
| 6-oxa-androstan-17β-ol-7-one | 6-oxa-$\Delta^8$-androsten-17β-ol-7-one. |
| 6-oxa-androstan-17β-ol-7-one benzoate | 6-oxa-$\Delta^8$-androsten-17β-ol-7-one benzoate. |
| 17α-(2'-carboxyethyl)-$\Delta^{1,4}$-androstadien-17β-ol-3-one spirolactone | 17α-(2'-carboxyvinyl)-$\Delta^{1,4}$-androstadien-17β-ol-3-one spirolactone. |
| 17α-(2'carboxyethyl)-19-nor-$\Delta^5$-androstene-3β,17β-diol-spirolactone | 17α-(2'-carboxyvinyl)-19-nor-$\Delta^5$-androstene-3β,17β-diol-spirolactone. |
| 17α-methyl-2-oxa-5α-androstan-17β-ol-3-one | 17α-methyl-2-oxa-$\Delta^4$-androsten-17β-ol-3-one. |
| 2-oxa-5α-androstan-17β-ol-3-one | 2-oxa-$\Delta^1$-androsten-17β-ol-3-one. |
| 12α-(2'-carboxyethyl)-$\Delta^{5,6}$-pregnadiene-3β,12β-diol-20-one spirolactone | 12α-(2'-carboxyvinyl)-$\Delta^{5,16}$-pregnadiene-3β,12β-diol-20-one spirolactone. |
| 12α-(2'-carboxyethyl)-$\Delta^5$-22-isospirostene-3β,12β-diol-spirolactone 3-acetate | 12α-(2'-carboxyvinyl)-$\Delta^5$-22-isospirostene-3β,12β-diol-spirolactone 3-acetate. |
| 11:12-seco-22-isoallo-spirostane-3β,12-diol-11-oic-(11→12)lactone 3-acetate | 11:12-seco-$\Delta^8$-22-iso-5α-spirostene-3β,12-diol-11-oic-(11→12)lactone 3-acetate. |
| 11:12-seco-$\Delta^{16}$-5α-pregnene-3β,12-diol-20-one-11-oic (11→12)lactone 3-acetate | 11:12-seco-$\Delta^{8,16}$-5α-pregnadiene-3β,12-diol-20-one-11-oic-(11→12) lactone 3-acetate. |
| 11:12-seco-5α-pregnane-3β,12,17α-triol-20-one-11-oic-(11→12) lactone | 11:12-seco-$\Delta^8$-5α-pregnene-3β,12,17α-triol-20-one-11-oic-(11→12)-lactone. |
| 11:12-seco-$\Delta^{1,4}$-pregnadiene-12,17α,21-triol-3,20-dione-11-oic-(11→12)-lactone 21-acetate | 11:12-seco-$\Delta^{1,4,8}$-pregnatriene-12,17α,21-triol-3,20-dione-11-oic-(11→12)lactone 21-acetate. |
| 4-oxa-$\Delta^5$-pregnene-3,20-dione | 4-oxa-$\Delta^{1,5,16}$-pregnatriene-3,20-dione. |
| 7:8-seco-cholestane-3β,8-diol-7-oic-(7→8)lactone | 7:8-seco-$\Delta^5$-cholestene-3β,8-diol-7-oic-(7→8)lactone. |
| 3:4-seco-cholestan-4-ol-3-oic-(3→4)lactone | 3:4-seco-$\Delta^1$-cholesten-4-ol-3-oic-(3→4)lactone. |
| Isoandrololactone | $\Delta^{15}$-dehydro-isoandrololactone. |
| Dihydrostrophanthidin | Strophanthidin. |
| Dihydrostrophanthidinic acid | Strophanthidinic acid. |
| Dihydrogitoxigenin | Gitoxigenin. |
| Bufotalan | Dehydrobufotalan. |
| Tetrahydrobufotalin | Dihydrobufotalin. |

I claim:

1. A process for the production of a,β-unsaturated steroid lactones which comprises treating an a,β;β,γ-saturated lactone with a quinone having an oxidation potential of less than −0.5 v. in an inert solvent for a period of time of from about 2 days to about 10 days.

2. The process of claim 1 wherein the amount of said benzoquinone is at least of approximately 1 molar equivalent.

3. The process of claim 1 wherein the inert solvent is a lower hydrocarbon ether.

4. The process of claim 1 wherein the inert solvent is a lower alkanol.

5. The process of claim 1 wherein the inert solvent is a homocyclic aromatic solvent.

6. The process of claim 1 wherein the inert solvent is a lower chlorinated hydrocarbon.

7. The process of claim 1 wherein the quinone is 2,3-dichloro-5,6-dicyano-1,4-benzohydroquinone.

8. The process of claim 1 wherein the quinone is tetrachloro-orthobenzoquinone.

9. The process of claim 1 wherein the quinone is 2,3-dicyano-parabenzoquinone.

10. The process of claim 1 wherein the quinone is 2,3-difluoro-parabenzoquinone.

11. The process of claim 1 wherein the solvent is dioxane.

12. The process of claim 1 wherein the solvent is toluene.

13. The process of claim 1 wherein the solvent is chloroform.

14. The process of claim 1 wherein the solvent is benzene.

15. The process of claim 1 wherein the solvent is t-butanol.

No references cited.

LEWIS GOTTS, *Primary Examiner*.